US009771028B2

(12) United States Patent
Finestone (10) Patent No.: US 9,771,028 B2
(45) Date of Patent: Sep. 26, 2017

(54) LOAD CARRYING ASSEMBLY

(71) Applicant: Jack Finestone, Durbanville (ZA)

(72) Inventor: Jack Finestone, Durbanville (ZA)

(73) Assignee: Jack Finestone, Rosendal, Durbanville (ZA)

( * ) Notice: Subject to any disclaimer, the term of this patent is extended or adjusted under 35 U.S.C. 154(b) by 0 days.

(21) Appl. No.: 15/233,345

(22) Filed: Aug. 10, 2016

(65) Prior Publication Data

US 2017/0066384 A1 Mar. 9, 2017

Related U.S. Application Data

(63) Continuation of application No. 14/420,145, filed as application No. PCT/IB2013/056433 on Aug. 6, 2013, now abandoned.

(30) Foreign Application Priority Data

Aug. 7, 2012 (ZA) .................................. 2012/05958

(51) Int. Cl.
| | |
|---|---|
| *B62D 33/02* | (2006.01) |
| *B60R 9/06* | (2006.01) |
| *B60P 3/40* | (2006.01) |

(52) U.S. Cl.
CPC ............ *B60R 9/06* (2013.01); *B62D 33/0207* (2013.01); *B60P 3/40* (2013.01); *B60Y 2200/14* (2013.01)

(58) Field of Classification Search
CPC .............................. B62D 33/0207; B60P 3/40
USPC ............ 296/3; 224/405; D12/222; 280/756; 293/3
See application file for complete search history.

(56) References Cited

U.S. PATENT DOCUMENTS

| | | | |
|---|---|---|---|
| 4,770,458 | A | 9/1988 | Burke et al. |
| 5,002,324 | A | 3/1991 | Griffin |
| 5,393,114 | A | 2/1995 | Christensen |
| 5,494,327 | A | 2/1996 | Derecktor |
| 7,464,977 | B1 | 12/2008 | Price |
| 2002/0036412 | A1 | 3/2002 | Bareket |
| 2008/0100075 | A1 | 5/2008 | Derecktor |

*Primary Examiner* — Jason S Morrow (57) ABSTRACT

A load carrying assembly for use with a pick-up truck having a load carrying bed, includes a first load bearing structure and a second load bearing structure which are both mounted to the truck above the bed. The structure includes a cross member and a pair of spaced apart upright support members. The structure includes a cross member and a pair of spaced apart upright support members. The assembly further includes an interlocking system comprising connecting formations in the form of bolt holes defined through the members and nuts and bolts for releasably bolting the structures to one another in an arrangement wherein certain members abut one another, thereby to form a unitary combined load bearing structure to provide for enhanced stable support of the load by the structure.

20 Claims, 5 Drawing Sheets

LOAD CARRYING ASSEMBLY

CROSS REFERENCE TO RELATED APPLICATIONS

This application is a Continuation filing and claims priority under 35 U.S.C. §121 of Application No. 14/420,145 filed on Feb. 6, 2015, now abandoned, which is a National Phase filing under 35 U.S.C. §317 of PCT/IB2013/056433 filed on Aug. 6, 2013; and this application claims priority to South African Application No. 2012/05958 filed on Aug. 7, 2012 under 35 U.S.C. §119.

FIELD OF INVENTION

This invention relates to a load carrying assembly for use with a vehicle having a load carrying bed for carrying a load.

SUMMARY OF INVENTION

According to the invention there is provided a load carrying assembly for use with a vehicle having a load carrying bed for carrying a load, the load carrying assembly including:

a first load bearing structure which is mountable to the vehicle above the load carrying bed of the vehicle, the first load bearing structure including a cross member and a pair of spaced apart upright support members near opposite ends of the cross member, which are mounted to the vehicle, in use;

a second load bearing structure which is mountable to the vehicle above the load carrying bed of the vehicle, the second load bearing structure including a cross member and a pair of spaced apart upright support members near opposite ends of the cross member, which are mounted to the vehicle, in use; and interlocking means configured for releasably interlocking the first load bearing structure and the second load bearing structure to one another in an arrangement wherein at least the upright support members of the load bearing structures abut one another, thereby to form a unitary combined load bearing structure in a structural supporting arrangement wherein the first and second load bearing structures structurally support one another, thereby to provide for enhanced stable support of the load by the unitary combined load bearing structure.

The interlocking means may be operable to releasably interlock the first load bearing structure and the second load bearing structure to one another in an arrangement wherein the upright support members and the cross members of the load bearing structures abut one another.

The interlocking means may be in the form of a pair of collar formations, each collar formation being configured to at least partially fit around a different pair of adjacent abutting upright support members of the load bearing structures when the upright support members abut one another, and to releasably clamp the upright support members to one another.

In a particular embodiment, the interlocking means may include at least one connecting formation associated with each of the upright support members of the first and second load bearing structures for releasably interlocking the upright support members of the first and second load bearing structures to one another. The interlocking means may include at least one connecting formation associated with each of the cross members of the load bearing structures for releasably interlocking the cross members of the load bearing structures to one another. As such, the first load bearing structure and the second load bearing structure may each have profiled faces which are complementary to one another and which abut one another when the load bearing structures are releasably interlocked to one another.

In a particular embodiment, the load carrying assembly may include releasable mounting means which are mounted to the vehicle and which are configured to permit the releasable mounting of at least one of the load bearing structures to the vehicle in an arrangement wherein the load bearing structures are interchangeable between a first condition wherein the load bearing structures are mounted to the vehicle adjacent to one another and releasably interlocked to one another; and a second condition wherein the load bearing structures are mounted to the vehicle in a spaced apart arrangement. The releasable mounting means may be in the form of a first pair of mounting structures which are mounted to the vehicle for releasably mounting the first load bearing structure to the vehicle, when the load bearing structures are in their first condition; and a second pair of mounting structures which are mounted to the vehicle in spaced apart relation to the first pair of mounting structures for releasably mounting the first load bearing structure to the vehicle, when the load bearing structures are in their second condition. The first load bearing structure may include a complementary releasable mounting formation disposed near a lower end of each upright support member, the complementary releasable mounting formations being configured to permit releasable mounting of the first load bearing structure to one of the first pair of mounting structures and the second pair of mounting structures, when the load bearing structures are interchanged between their first and second conditions. The second load bearing structure may have a base support structure defined at operative lower ends of the upright support members, which are mounted to the vehicle, in use. More particularly, the first pair of mounting structures may extend from an end region of the base support structures of the second load bearing structure. More specifically, the first pair of mounting structures and the base support structures of the second load bearing structure may be integrally formed with one another.

In a particular embodiment, the load carrying assembly may be configured for use with a vehicle in the form of a pick-up truck having a cab and a load box disposed rearwardly of the cab, the load box including the load carrying bed and walls which surround the load carrying bed, the walls of the load box including a cab wall, a tail gate disposed opposite to the cab wall and a pair of opposite side walls extending between the cab wall and the tail gate; and wherein the mounting structures of the releasable mounting means of the load carrying assembly are configured to be mounted to upper ends of the side walls of the load box.

The load carrying assembly may include slidable mounting means for slidably mounting the first load bearing structure to the vehicle in an arrangement permitting sliding displacement of the first load bearing structure relative to the second load bearing structure. The slidable mounting means may comprise a pair of track formations which are mountable to the vehicle on opposite sides of the load bed; and track engaging formations which are defined on operative lower regions of the upright support members of the first load bearing structure, which are configured to permit sliding displacement of the first load bearing structure along the pair of track formations, for displacing the first load bearing structure relative to the second load bearing structure, in use.

The invention extends to a vehicle having a load carrying bed for carrying a load and a load carrying assembly, as described and defined hereinabove, mounted to the vehicle.

BRIEF DESCRIPTION OF THE DRAWINGS

Further features of the invention are described hereinafter by way of a non-limiting example of the invention, with reference to and as illustrated in the accompanying diagrammatic drawings. In the drawings.

DETAILED DESCRIPTION OF THE DRAWINGS

With reference to FIGS. 1 to 4 of the drawings, a load carrying assembly in accordance with the invention, is designated generally by the reference numeral 10. The load carrying assembly 10 is configured for use with a vehicle in the form of a pick-up truck 2 having a cab 4 and a load box 5 disposed rearwardly of the cab 4, the load box 5 including a load carrying bed 3 and walls which surround the load carrying bed 3 and which include a cab wall 6, a tailgate 7 disposed opposite to the cab wall and a pair of opposite side walls 8.1, 8.2 extending between the cab wall 6 and the tailgate 7.

The load carrying assembly 10 comprises broadly a first load bearing structure 12; a second load bearing structure 14; releasable mounting means in the form of mounting structures 18; slidable mounting means in the form of a slidable mounting system 20 and interlocking means in the form of an interlocking system 22.

Figure 1:
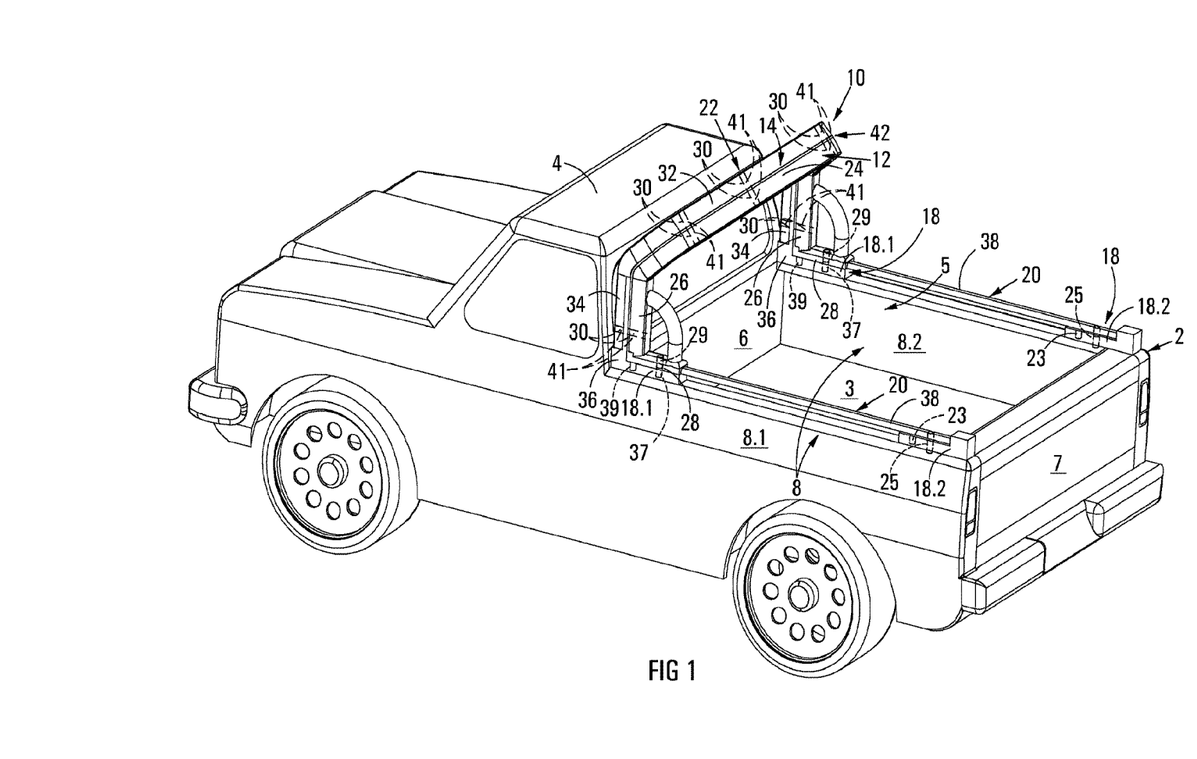
FIG. 1 shows a perspective view of a load carrying assembly, in accordance with the invention, mounted to a vehicle and shown in a first condition thereof.
Figure 2:
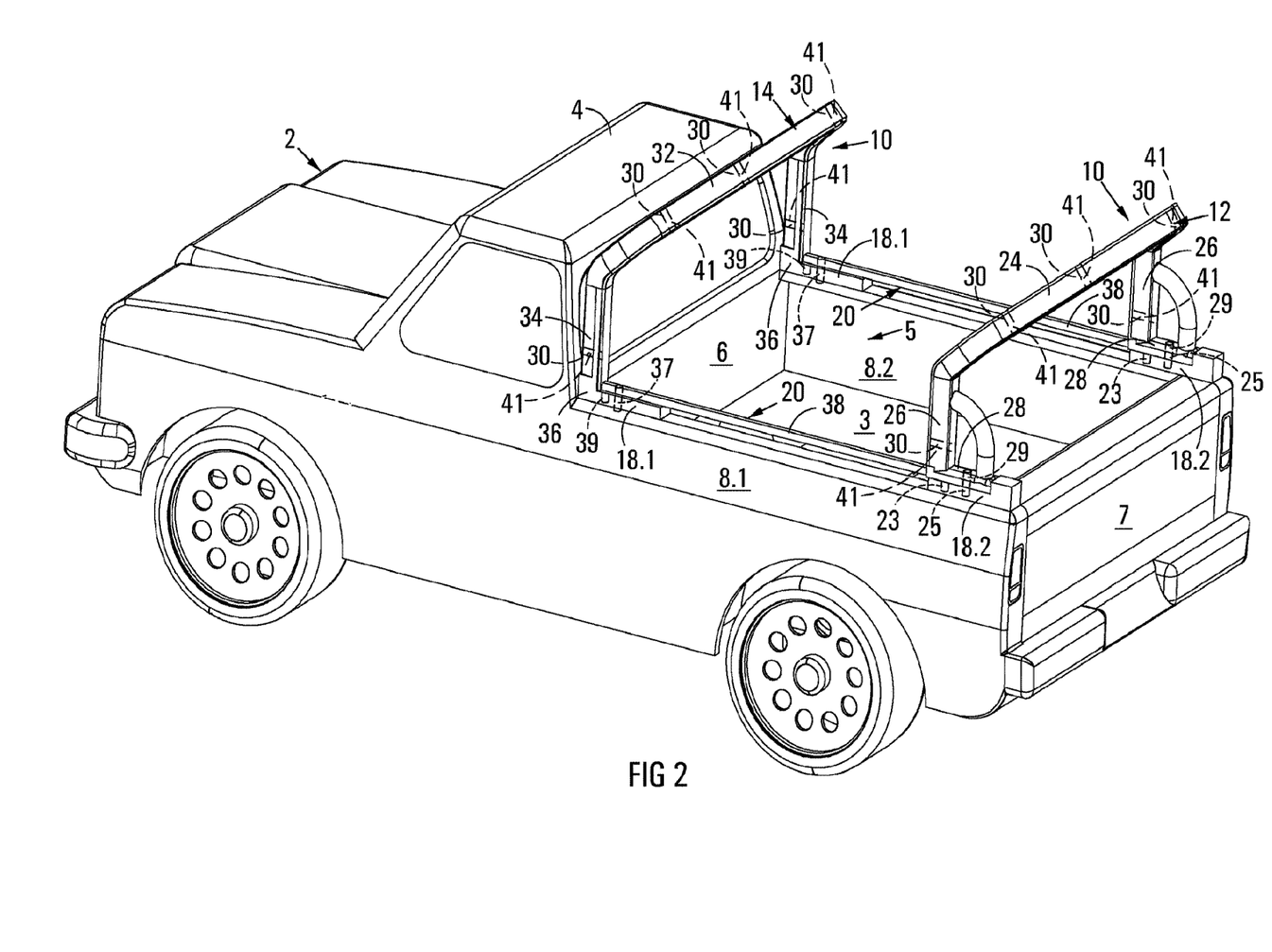
FIG. 2 shows a perspective view of the load carrying assembly of FIG. 1, shown interchanged into a second condition thereof.

The first load bearing structure 12 is releasably mountable to the pick-up truck 2 above the load carrying bed 3 of the pick-up truck 2, as illustrated in FIGS. 1 and 2 of the drawings. The first load bearing structure 12 includes a cross member 24; a pair of spaced apart upright support members 26 extending from opposite ends of the cross member 24; and complementary releasable mounting formations in the form of base plates 28 disposed at lower ends of the upright support members 26 and integrally formed therewith, the purposes of which will be explained in more detail hereinbelow. The base plates 28 each have an inverted U-shaped configuration when viewed in sectional view, as illustrated in FIG. 4b of the drawings, the purpose of which will be explained hereinbelow.

The second load bearing structure 14 is releasably mountable to the pick-up truck 2 above the load carrying bed 3 of the pick-up truck. The second load bearing structure 14 includes a cross member 32; a pair of spaced apart upright support members 34 extending from opposite ends of the cross member 32; and base support structures 36 disposed at opposite lower ends of the upright support members 34 and integrally formed therewith, the purposes of which will be explained in more detail hereinbelow. The base support structures 36 have bolt holes 39 extending therethrough and have flat planar bases defined on undersides thereof, which are configured to be bolted onto upper ends of the side walls 8.1, 8.2 of the pick-up truck 2, as illustrated in FIGS. 1 and 2 of the drawings. More particularly, the base support structures 36 are bolted to the upper ends of the side walls by means of bolts (not shown) received through bolt holes 39. As shown in FIGS. 1 and 2 of the drawings, the second load bearing structure 14 is secured to the pick-up truck 2 at a position adjacent to the cab wall 6.

Figure 4A:
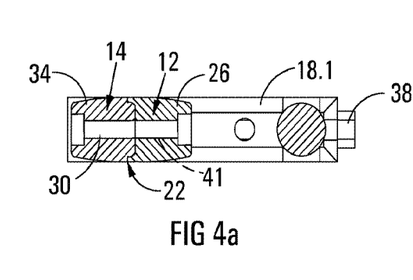
FIG. 4a shows a sectional view of the load carrying assembly of FIG. 3, sectioned along section lines 4a-4a of FIG. 3.
Figure 4B:
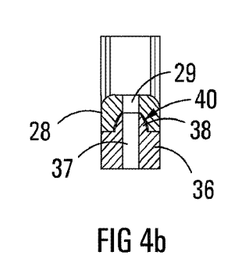
FIG. 4b shows a sectional view of the load carrying assembly of FIG. 3, sectioned along section lines 4b-4b of FIG. 3.

The load bearing structures 12, 14 have profiled faces which are complementary to one another, as shown in FIG. 4A of the drawings, for reasons which will be explained hereinbelow.

The mounting structures 18 are configured to be mounted to upper ends of the side walls 8.1, 8.2 of the load box 5 of the pick-up truck 2 and are configured to permit releasable mounting of the base plates 28 of the first load bearing structure 12 for releasably mounting the first load bearing structure 12 to the pick-up truck 2.

Figure 3:
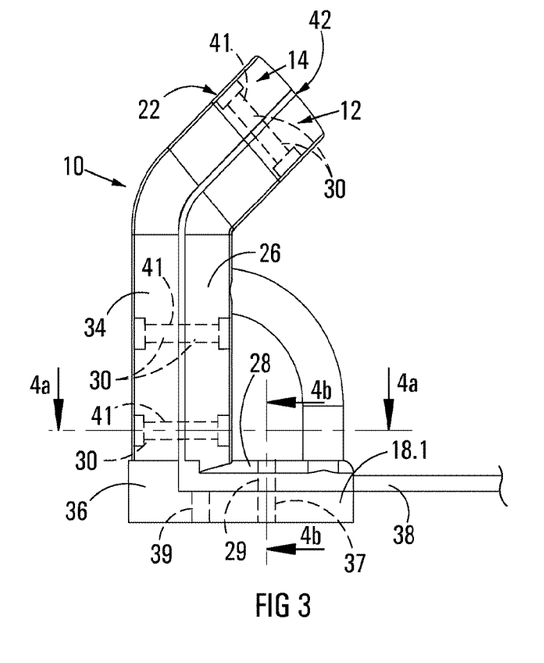
FIG. 3 shows an enlarged side view of the load carrying assembly of FIG. 1.

The mounting structures 18 include a first pair of mounting plates 18.1 and a second pair of mounting plates 18.2. The first pair of mounting plates 18.1 are defined on upper ends of the base support structures 36 and are integrally formed therewith, as is best shown in FIG. 3 of the drawings. The first pair of mounting plates 18.1 have bolt holes 37 defined therethrough. The second pair of mounting plates 18.2 each have bolt holes 23 permitting the plates 18.2 to be bolted to upper ends of the side walls 8.1, 8.2 of the load box 5 of the pick-up truck 2, at positions adjacent to the tailgate 7, as illustrated in FIGS. 1 and 2 of the drawings. The second pair of mounting plates 18.2 also have bolt holes 25 defined therethrough, the purpose of which will be explained in more detail hereinbelow.

The slidable mounting system 20 is configured to permit the slidable mounting of the first load bearing structure 12, relative to the second load bearing structure 14. The slidable mounting system 20 comprises a pair of track formations 38 and a pair of complementary track engaging formations 40 defined by the U-shaped configuration of the base plates 28 of the first load bearing structure 12. The pair of track formations 38 are mounted to upper ends of the pair of side walls 8.1, 8.2 and extend across the first pair of mounting plates 18.1 and the second pair of mounting plates 18.2, as illustrated in FIGS. 1 to 4 of the drawings. The track engaging formations 40 are each configured for slidably receiving a different one of the track formations 38 therein. The track engaging formations 40 and the track formations 38 are configured, shaped and dimensioned to permit sliding displacement of the first load bearing structure 12 along the pair of track formations 38, for displacing the first load bearing structure 12 relative to the second load bearing structure 12, for reasons which will be explained in more detail hereinbelow.

The interlocking system 22 is configured for releasably interlocking the first load bearing structure 12 and the second load bearing structure 14 to one another in an interlocked configuration when the cross members 24, 32 and the upright support members 26, 34 of the load bearing structures 12, 14 abut one another, thereby to form a unitary combined load bearing structure 42 in a structural supporting arrangement wherein the load bearing structures 12, 14 structurally support one another, as shown in FIG. 1 of the drawings, thereby to provide for enhanced stable support of the load by the unitary combined load bearing structure 42. The interlocking system 22 comprises connecting formations in the form of bolt holes 30 defined through the cross members 24, 32 and the upright support members 26, 34 of the load bearing structures 12, 14; and nuts and bolts (not shown), for firmly and releasably interlocking the load bearing structures 12, 14 to one another. The complementary profiled faces of the load bearing structures 12, 14 permit the faces to be brought into close contact with and abut one another, when the load bearing structures 12, 14 are in their interlocked configuration.

In use, the first load bearing structure 12 and the second load bearing structure 14 are interchangeable between a first condition (shown in FIG. 1) wherein the load bearing structures 12, 14 are mounted to the pick-up truck 2 adjacent to one another in their interlocked configuration, thereby to provide the unitary combined load bearing structure 42 for stable support of a load by the unitary combined load bearing structure 42; and a second condition (shown in FIG. 2) wherein the load bearing structures 12, 14 are mounted to the pick-up truck 2 in a spaced apart arrangement.

More particularly, as shown in FIG. 1 of the drawings, when the load bearing structures 12, 14 are in their first condition, the base plates 28 of the first load bearing structure 12 are releasably mounted to the first pair of mounting plates 18.1 by bolts (not shown) which are received through bolt holes 29 of the base plates 28 and through bolt holes 37 of the first pair of mounting plates 18.1. The load bearing structures 12, 14 are then releasably locked to one another in the manner described hereinabove so as to form the unitary combined load bearing structure 42. When the load bearing structures 12, 14 are in their second condition, the base plates 28 of the first load bearing structure 12 are releasably mounted to the second pair of mounting plates 18.2, as illustrated in FIG. 2 of the drawings. More particularly, bolts (not shown) are received through bolt holes 25 of the second pair of mounting plates 18.2 and through bolt holes 29 of the base plates 28 for releasably bolting the base plates 28 and the second pair of mounting plates 18.2 to one another.

The applicant envisages that the unitary combined load bearing structure 42 will have enhanced strength and load bearing capacity. More particularly, the load bearing capacity of the unitary combined load bearing structure 42 will be greater than the load bearing capacity of the first load bearing structure 12 and the second load bearing structure 14, when the load bearing structures are in their second condition. As such, the unitary combined load bearing structure 42 thus permits particularly heavy loads such as, for example, timber or a motorbike to be tethered to the unitary combined load bearing structure 42. The applicant thus envisages that the unitary combined load bearing structure 42 is particularly beneficial for carrying loads which are too heavy to be supported by the first load bearing structure 12 and the second load bearing structure 14, when the load bearing structures 12, 14 are in their second condition.

Figure 5:
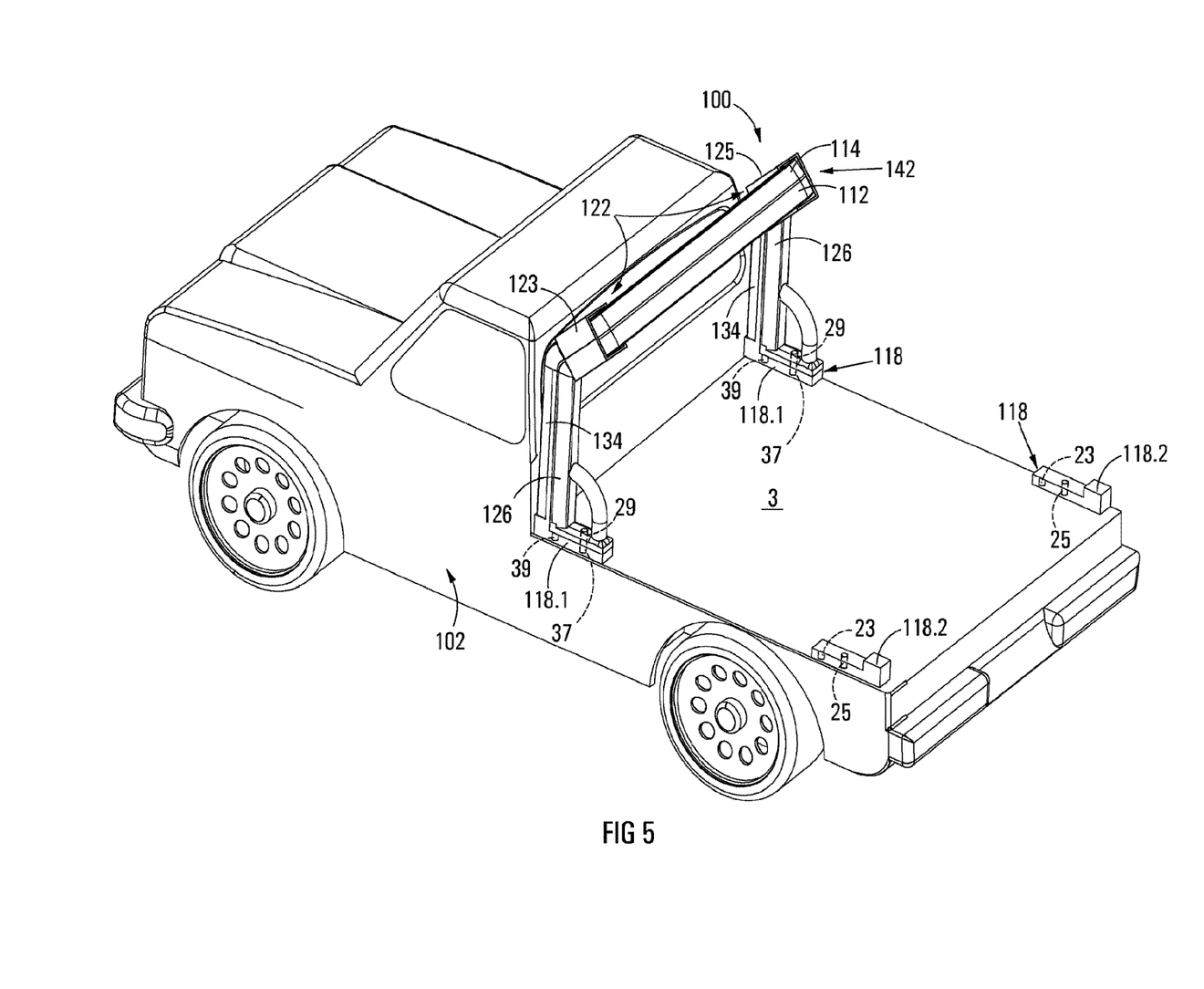
FIG. 5 shows a perspective view of another embodiment of a load carrying assembly in accordance with the invention, mounted to another vehicle and shown in a first condition thereof.
Figure 6:
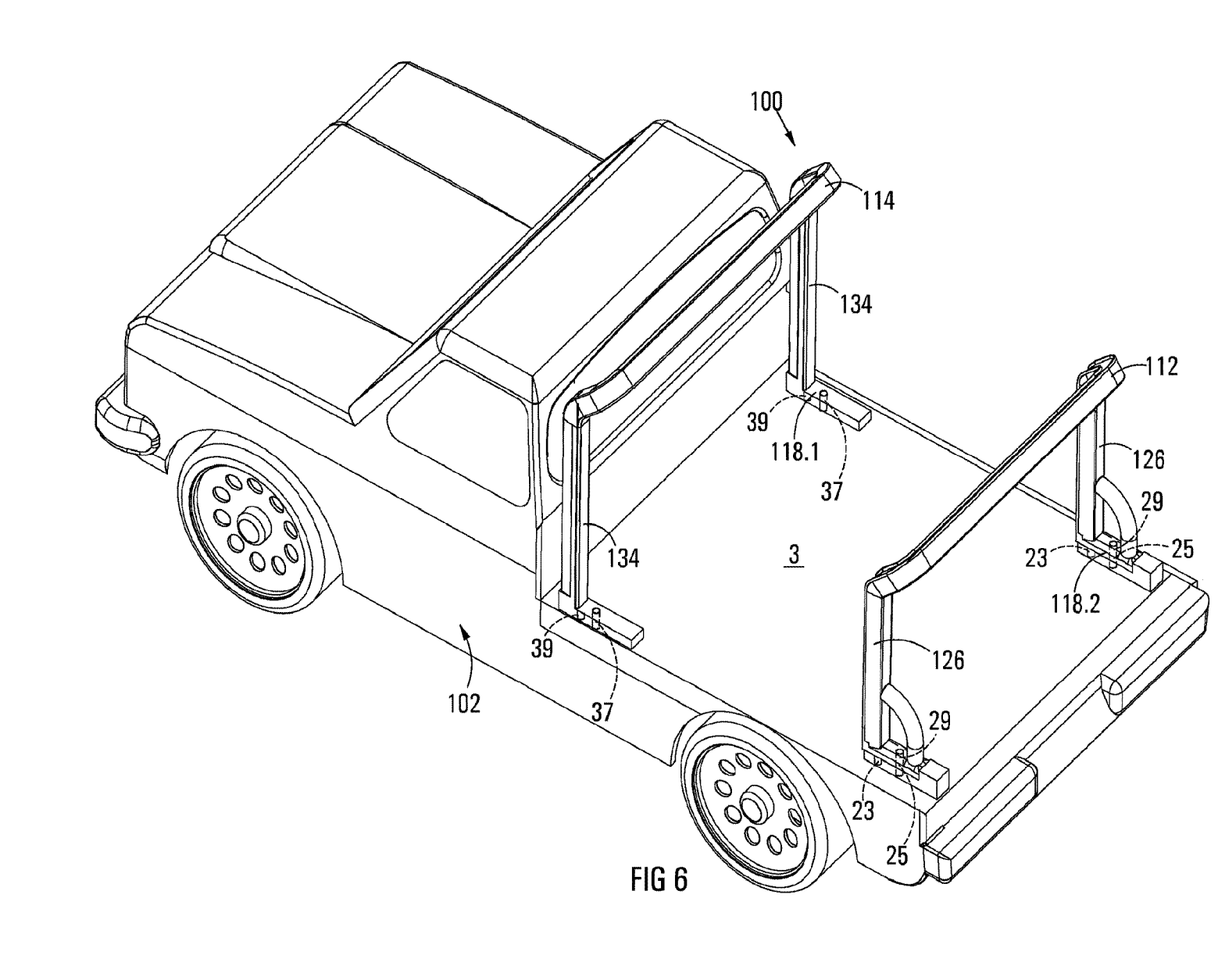
FIG. 6 shows a perspective view of the load carrying assembly of FIG. 5, shown interchanged into a second condition thereof.

With reference to FIGS. 5 and 6 of the drawings, another embodiment of a load carrying assembly, in accordance with the invention, is designated generally by the reference numeral 100.

The load carrying assembly 100 is configured for use with a vehicle in the form of a flat bed truck 102 having a flat bed trailer defining a load carrying bed 3 for carrying a load.

The load carrying assembly 100 of FIGS. 5 and 6 of the drawings is similar to the load carrying assembly 10 of FIGS. 1 to 4 of the drawings. As such, features of the load carrying assembly 100 which are the same and/or similar to features of the load carrying assembly 10, are designated by the same and/or similar reference numerals in FIGS. 5 and 6 of the drawings. What is stated above in relation to the load carrying assembly 10 applies generally to the load carrying assembly 100.

The load carrying assembly 100 comprises broadly a first load bearing structure 112; a second load bearing structure 114; releasable mounting means in the form of mounting structures 118 and interlocking means in the form of an interlocking system 122.

The first and second load bearing structures 112, 114 of the load carrying assembly 100 are similar to the first and second load bearing structures 12, 14, respectively, of the load carrying assembly 10 of FIGS. 1 to 4 of the drawings. However, the load bearing structures 112, 114 differ from the load bearing structures 12, 14 in that the load bearing structures 112, 114 each have a pair of spaced apart upright support members 126, 134, respectively, which have lengths which are relatively longer than the lengths of the upright support members 26, 34 of the load carrying assembly 10.

The interlocking system 122 of the load carrying assembly 100 differs from the interlocking system 22 of the load carrying assembly 10. More particularly, the interlocking system 122 of the load carrying assembly 100 comprises a pair of interlocking collars 123 and 125 which are configured to partially surround the first and second load bearing structures 112, 114 for releasably interlocking the first and second load bearing structures 112, 114 to one another, when the load bearing structures 112, 114 are in their first condition. More particularly, the collars 123, 125 will be fixedly bolted to one another for clamping the first and second load bearing structures 112, 114 to one another.

The applicant envisages that the load carrying assembly 100 may be fitted to any type of a vehicle having a load bed, even, for example, the pick-up truck 2, if desired.

It will be appreciated that the exact configuration of the load carrying assembly 10, 100 of the invention may be greatly variable whilst still incorporating the essential features of the invention. The invention clearly extends also to such variations which still incorporate the essential features of the invention as described and defined hereinabove.

The invention extends to a vehicle having a load carrying bed for carrying a load and the load carrying assembly 10, 100 mounted thereto.

The invention claimed is:

1. A load carrying assembly for use with a vehicle having a load carrying bed for carrying a load, the load carrying assembly including:
   a first bearing structure which is mountable to the vehicle above the load carrying bed of the vehicle, the first load bearing structure including a cross member and a pair of spaced apart upright support members near opposite ends of the cross member, which are mounted to the vehicle, in use;
   a second load bearing structure which is mountable to the vehicle above the load carrying bed of the vehicle, the second load bearing structure including a cross member and a pair of spaced apart upright support members near opposite ends of the cross member; which are mounted to the vehicle in use; and
   interlocking means configured for releasably interlocking the first load bearing structure and the second load bearing structure to one another in an arrangement wherein the upright support members and the cross members of the load bearing structures abut one another, thereby to form a unitary combined load bearing structure in a structural supporting arrangement wherein the first and second load bearing structures structurally support one another, thereby to provide for enhanced stable support of the load by the unitary combined load bearing structure;

wherein the first load bearing structure and the second load bearing structure each have profiled faces which are complementary to one another and which abut one another when the load bearing structures are releasably interlocked to one another.

2. A load carrying assembly as claimed in claim 1, wherein the interlocking means is in the form of a pair of collar formations, each collar formation being configured to at least partially fit around a different pair of adjacent abutting upright support members of the load bearing structures when the upright support members abut one another, and to releasably clamp the upright support members to one another.

3. A load carrying assembly as claimed in claim 1, wherein the interlocking means includes at least one connecting formation associated with each of the upright support members of the first and second load bearing structures for releasably interlocking the upright support members of the first and second load bearing structures to one another.

4. A load carrying assembly as claimed in claim 1, wherein the interlocking means include at least one connecting formation associated with each of the cross members of the load bearing structures for releasably interlocking the cross members of the load bearing structures to one another.

5. A load carrying assembly as claimed in claim 1, wherein the load carrying assembly includes releasable mounting means which are mounted to the vehicle and which are configured to permit the releasable mounting of at least one of the load bearing structures to the vehicle in an arrangement wherein the load bearing structures are interchangeable between a first condition wherein the load bearing structures are mounted to the vehicle adjacent to one another and releasably interlocked to one another; and a second condition wherein the load bearing structures are mounted to the vehicle in a spaced apart arrangement.

6. A load carrying assembly as claimed in claim 5, wherein the releasable mounting means is in the form of a first pair of mounting structures which are mounted to the vehicle for releasably mounting the first load bearing structure to the vehicle, when the load bearing structures are in their first condition; and a second pair of mounting structures which are mounted to the vehicle in spaced apart relation to the first pair of mounting structures for releasably mounting the first load bearing structure to the vehicle, when the load bearing structures are in their second condition.

7. A load carrying assembly as claimed in claim 6, wherein the first load bearing structure includes a complementary releasable mounting formation disposed near a lower end of each upright support member, the complementary releasable mounting formations being configured to permit releasable mounting of the first load bearing structure to one of the first pair of mounting structures and the second pair of mounting structures, when the load bearing structures are interchanged between their first and second conditions.

8. A load carrying assembly as claimed in claim 6, wherein the second load bearing structure has a base support structure defined at operative lower ends of the upright support members, which are mounted to the vehicle, in use.

9. A load carrying assembly as claimed in claim 8, wherein the first pair of mounting structures extend from an end region of the base support structures of the second load bearing structure.

10. A load carrying assembly as claimed in claim 9, wherein the first pair of mounting structures and the base support structures of the second load bearing structure are integrally formed with one another.

11. A load carrying assembly as claimed in claim 6, wherein the load carrying assembly is configured for use with a vehicle in the form of a pick-up truck having a cab and a load box disposed rearwardly of the cab, the load box including the load carrying bed and walls which surround the load carrying bed, the walls of the load box including a cab wall, a tail gate disposed opposite to the cab wall and a pair of opposite side walls extending between the cab wall and the tail gate; and wherein the mounting structures of the releasable mounting means of the load carrying assembly are configured to be mounted to upper ends of the side walls of the load box.

12. A load carrying assembly as claimed in claim 1, wherein the load carrying assembly includes slidable mounting means for slidably mounting the first load bearing structure to the vehicle in an arrangement permitting sliding displacement of the first load bearing structure relative to the second load bearing structure.

13. A load carrying assembly as claimed in claim 12, wherein the slidable mounting means comprises a pair of track formations which are mountable to the vehicle on opposite sides of the load bed; and track engaging formations which are defined on operative lower regions of the upright support members of the first load bearing structure, which are configured to permit sliding displacement of the first load bearing structure along the pair of track formations, for displacing the first load bearing structure relative to the second load bearing structure, in use.

14. A vehicle having a load carrying bed for carrying a load and a load carrying assembly, as claimed in claim 1, mounted to the vehicle.

15. A load carrying assembly as claimed in claim 5, wherein the releasable mounting means are configured to permit releasable mounting of both the load bearing structures to the to the vehicle.

16. A load carrying assembly as claimed in claim 1, wherein the first load bearing structure and the second load bearing structure each have profiled faces which are complementary to one another and which abut one another when the load bearing structures are releasably interlocked to one another.

17. A load carrying assembly as claimed in claim 2, wherein the first load bearing structure and the second load bearing structure each have profiled faces which are complementary to one another and which abut one another when the load bearing structures are releasably interlocked to one another.

18. A load carrying assembly as claimed in claim 3, wherein the first load bearing structure and the second load bearing structure each have profiled faces which are complementary to one another and which abut one another when the load bearing structures are releasably interlocked to one another.

19. A load carrying assembly as claimed in claim 1, wherein said profiled faces have complementary recesses and protrusions.

20. A load carrying assembly as claimed in claim 5, wherein the releasable mounting means are configured to permit the releasable mounting of both the load bearing structures to the vehicle.

\* \* \* \* \*